(12) United States Patent
Skilton et al.

(10) Patent No.: US 12,311,615 B2
(45) Date of Patent: May 27, 2025

(54) FLAT COMPOSITE PANEL WITH TEAR ARRESTMENT AND METHOD OF MAKING THE SAME

(71) Applicant: The Boeing Company, Chicago, IL (US)

(72) Inventors: Richard A. Skilton, Bothell, WA (US); Stephen T. Dougherty, Auburn, WA (US); Daniel Paul Hope Marx, Seattle, WA (US)

(73) Assignee: The Boeing Company, Chicago, IL (US)

( * ) Notice: Subject to any disclaimer, the term of this patent is extended or adjusted under 35 U.S.C. 154(b) by 523 days.

(21) Appl. No.: 17/647,186

(22) Filed: Jan. 6, 2022

(65) Prior Publication Data
US 2022/0234714 A1 Jul. 28, 2022

Related U.S. Application Data

(60) Provisional application No. 63/142,767, filed on Jan. 28, 2021.

(51) Int. Cl.
| | | |
|---|---|---|
| *B29C 70/08* | (2006.01) | |
| *B29C 70/38* | (2006.01) | |
| *B29C 70/68* | (2006.01) | |
| *B64C 1/10* | (2006.01) | |
| *B64F 5/10* | (2017.01) | |
| B29K 63/00 | (2006.01) | |
| B29K 307/04 | (2006.01) | |
| B29L 31/30 | (2006.01) | |
| B64C 1/00 | (2006.01) | |
| B64C 1/06 | (2006.01) | |

(52) U.S. Cl.
CPC ............ *B29C 70/08* (2013.01); *B29C 70/382* (2013.01); *B29C 70/68* (2013.01); *B64C 1/10* (2013.01); *B64F 5/10* (2017.01); *B29K 2063/00* (2013.01); *B29K 2307/04* (2013.01); *B29L 2031/3076* (2013.01); *B64C 2001/0072* (2013.01); *B64C 1/061* (2013.01)

(58) Field of Classification Search
CPC ........... B64C 25/04; B64C 25/14; B64C 3/26; B64C 3/52; B64C 1/061; B64C 1/0683; B64C 1/18; B64C 1/10; B64C 3/182; B64C 3/187
See application file for complete search history.

(56) References Cited

U.S. PATENT DOCUMENTS 4,741,943 A * 5/1988 Hunt ..................... B64C 3/26
428/113
2004/0256537 A1* 12/2004 Richards ............. B29C 45/7312
249/79

(Continued)

OTHER PUBLICATIONS

Canadian Intellectual Property Office Examination Report, dated Jan. 8, 2024, regarding Application No. CA3138153, 3 pages.

*Primary Examiner* — Alison L Hindenlang
*Assistant Examiner* — Debjani Roy
(74) *Attorney, Agent, or Firm* — Yee & Associates, P.C.

(57) ABSTRACT

A pressure deck for an aircraft comprises a flat composite laminate base panel having integrated tear straps to enhance damage arrestment. The tear straps include a plurality of multi-ply, spaced apart longitudinal and lateral tear straps interspersed with the plies of the base panel.

23 Claims, 13 Drawing Sheets

(56) References Cited

U.S. PATENT DOCUMENTS

| | | | |
|---|---|---|---|
| 2011/0045232 A1* | 2/2011 | Kismarton | B29C 66/474 |
| | | | 428/113 |
| 2011/0101164 A1* | 5/2011 | Koch | B64C 1/36 |
| | | | 156/60 |
| 2016/0311051 A1* | 10/2016 | Nordman | B64C 3/20 |
| 2021/0031903 A1* | 2/2021 | Murray | B64C 1/10 |

* cited by examiner

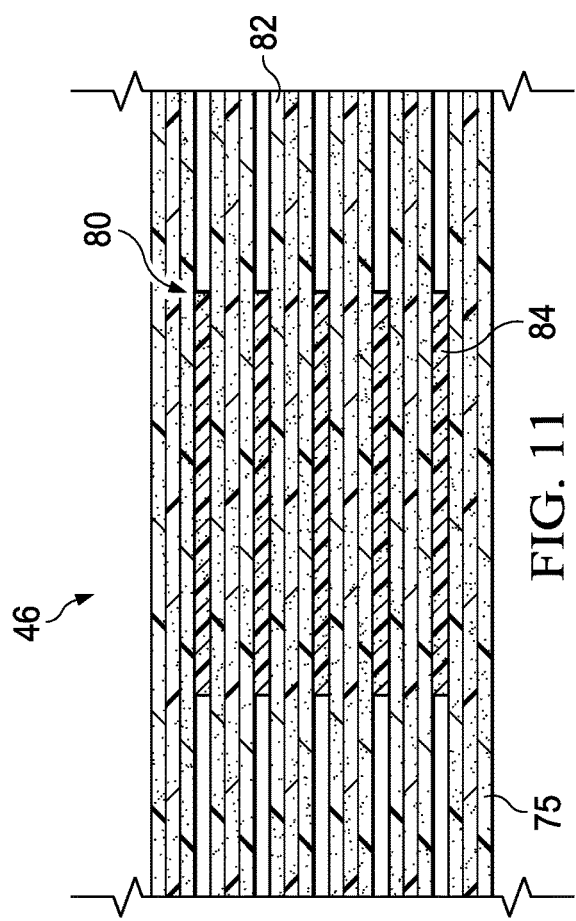
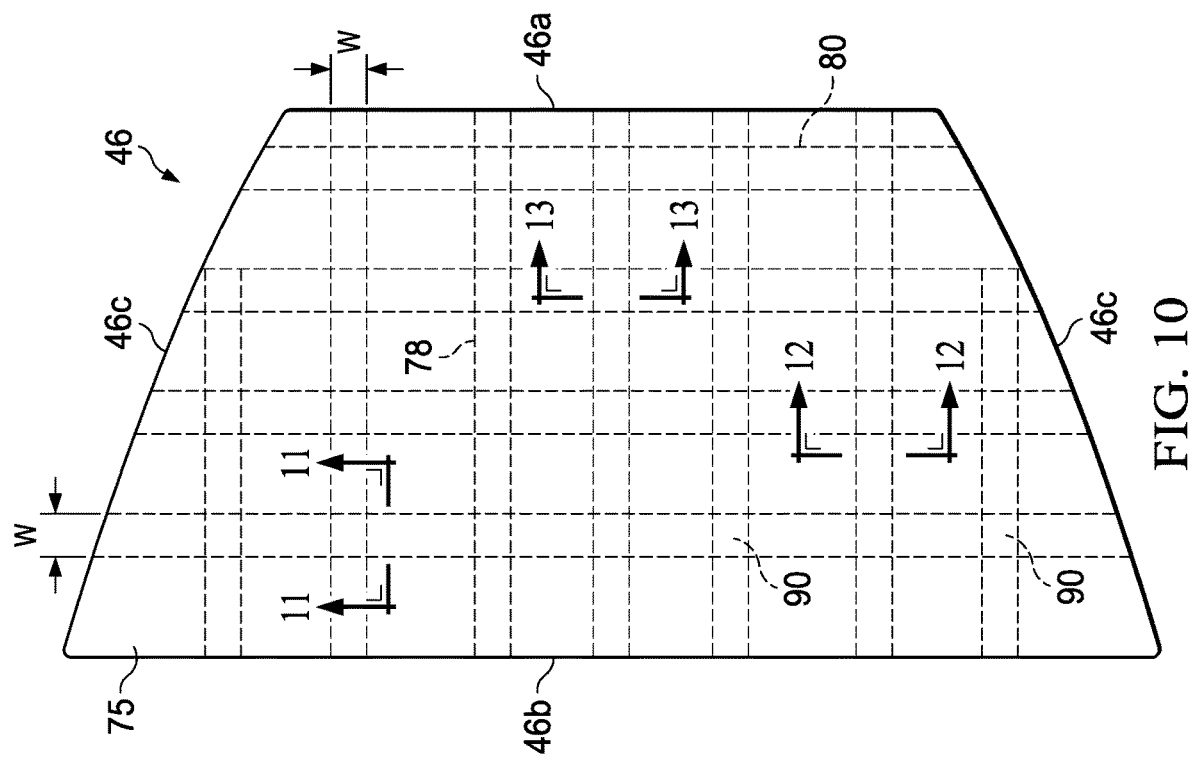
FIG. 11
FIG. 10

FLAT COMPOSITE PANEL WITH TEAR ARRESTMENT AND METHOD OF MAKING THE SAME

CROSS-REFERENCE TO RELATED APPLICATION

This application claims the benefit of U.S. Provisional Patent Application Ser. No. 63/142,767, filed Jan. 28, 2021, and entitled "Flat Composite Panel with Tear Arrestment and Method of Making the Same" which is incorporated herein by reference in its entirety.

BACKGROUND INFORMATION

1. Field

The present disclosure generally relates to composite structures and deals more particularly with a flat composite panel having an integral tear arrestment feature.

2. Background

Flat composite panels are sometimes subject to impact damage. Designing the panel to arrest impact damage can be challenging, particularly where the panel is relatively thin and requires stiffening features. For example, a flat composite panel may be used in an aircraft to separate pressurized and non-pressurized spaces. One aircraft application of such panels is a pressure deck which separates a flight deck from a nose wheel landing gear well. The pressure deck comprises a composite laminate panel that is reinforced with external stiffeners such as stringers that are co-cured with the panel. Both the stiffeners and the panel are subject to impact damage as a result of debris that may be propelled during takeoffs and landings.

Pressure decks of the type described above require specialized tooling to layup, form and co-cure the stiffeners with the panel. Also, impact damage to these pressure decks can be time-consuming and challenging to repair. Damaged stiffeners must be removed and replacement stiffeners must be laid up, formed, and bonded to the panel, following which pull-off tests will be performed to assure that the stiffener are adequately attached to the panel. This repair process becomes even more complicated when the panel itself has been damaged.

Accordingly, it would be desirable to provide a flat composite panel having greater stiffness and damage resistance without the use of stiffeners.

SUMMARY

The disclosure relates in general to composite panels, and more specifically to a pressure deck for aircraft with damage arrestment features.

According to one aspect, a composite panel having tear arrestment comprises a base panel, at least a first tear strap and at least a second tear strap. The base panel includes a plurality of base panel plies of a fiber reinforced polymer. The first tear strap extends in a first direction and is integrated into the base plies. The second tear strap extends in a second direction transverse to the first direction and is integrated into the base panel plies.

According to another aspect, a pressure deck panel is provided for an aircraft separating a flight deck from a nose wheel well. The pressure deck panel comprises a base panel including a plurality of plies of a fiber reinforced polymer, and a plurality of tear straps integrated into the base panel.

According to still another aspect, a method is provided of fabricating a composite pressure deck panel for an aircraft. The method includes laying up a base panel, including laying up a plurality of base panel plies of composite material. The method also includes integrating a plurality of first tear straps into the base panel plies, and integrating a plurality of second tear straps into the base panel plies. Integrating the first and second tear straps includes interspersing them with the base panel plies as the base panel plies are laid up. The method also includes orienting the plurality of second tear straps transverse to the plurality of first tear straps.

According to still another aspect, a method is provided of arresting a tear in a composite laminate panel. The method comprises interspersing a plurality of tear straps within plies of the laminate panel, and using the tear straps to arrest a tear in the laminate panel.

One of the advantages of the disclosed embodiments is that a flat composite laminate panel can be produced with the necessary stiffness and tear resistance to impacts without the need for stiffener attachments and associated tooling. Another advantage is that the disclosed flat composite laminate panel can be used as a pressure deck for aircraft. Another advantage is that the flat composite laminate panel is less subject to impact impairment as a result of the use of integral tear straps. Still another advantage is that impact impairment of the panel is more easily repaired using commonly used tools and methods.

The features, functions, and advantages can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and advantages thereof, will best be understood by reference to the following detailed description of an illustrative examples of the present disclosure when read in conjunction with the accompanying drawings, wherein:

FIG. 10 is an illustration of a top plan view of the flat composite panel shown in FIG. 9, integrated tear straps shown in broken lines.

FIG. 11 is an illustration of a sectional view taken along the line 11-11 in FIG. 10.

DETAILED DESCRIPTION

Figure 1:
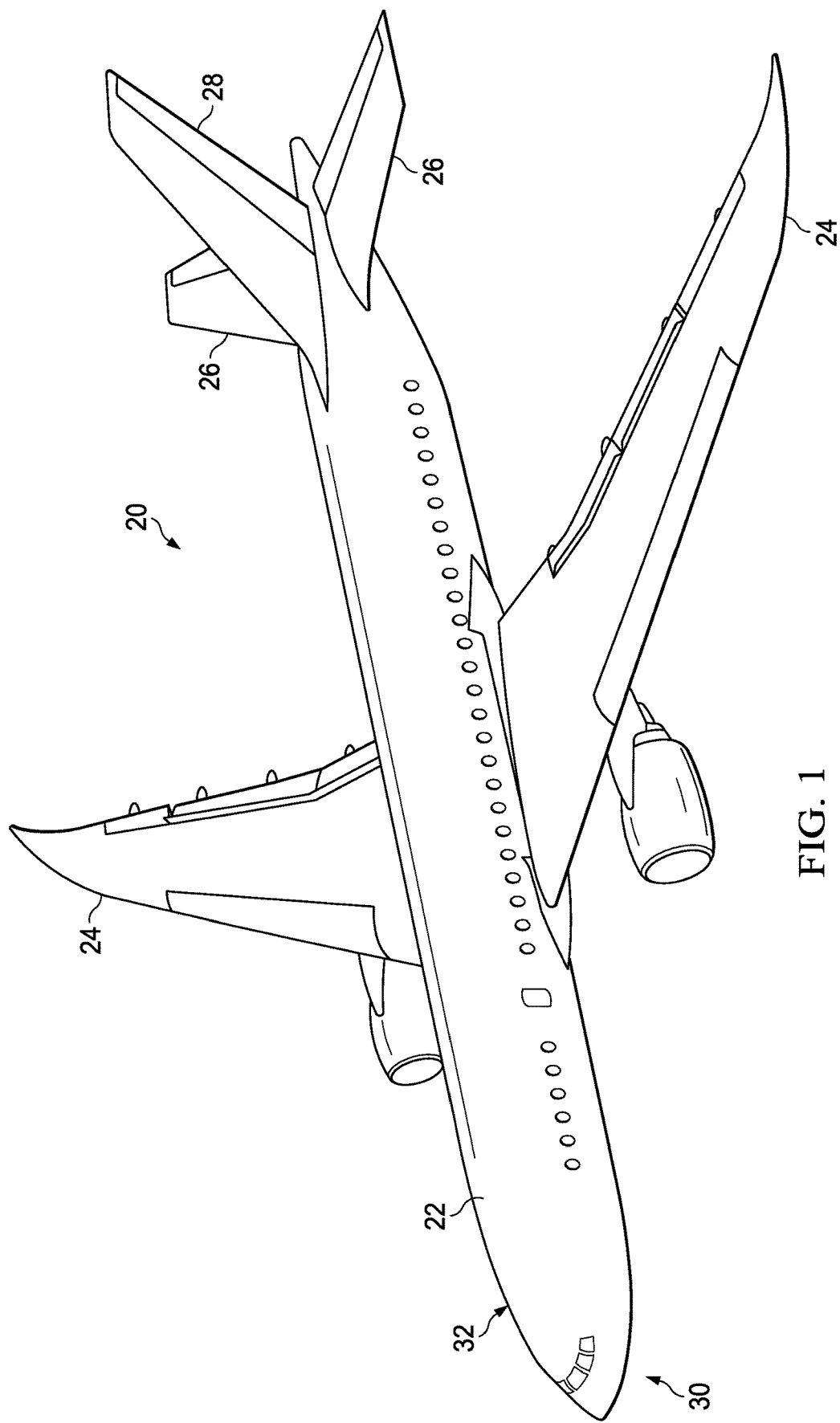
FIG. 1 is an illustration of a perspective view of an aircraft.

Referring first to FIG. 1, an aircraft 20 comprises a fuselage 22, wings 24, horizontal stabilizers 26 and a vertical stabilizer 28. The aircraft 20 has a nose section 30 that includes a pressurized flight deck 32, sometimes referred to as a cockpit.

Figure 2:
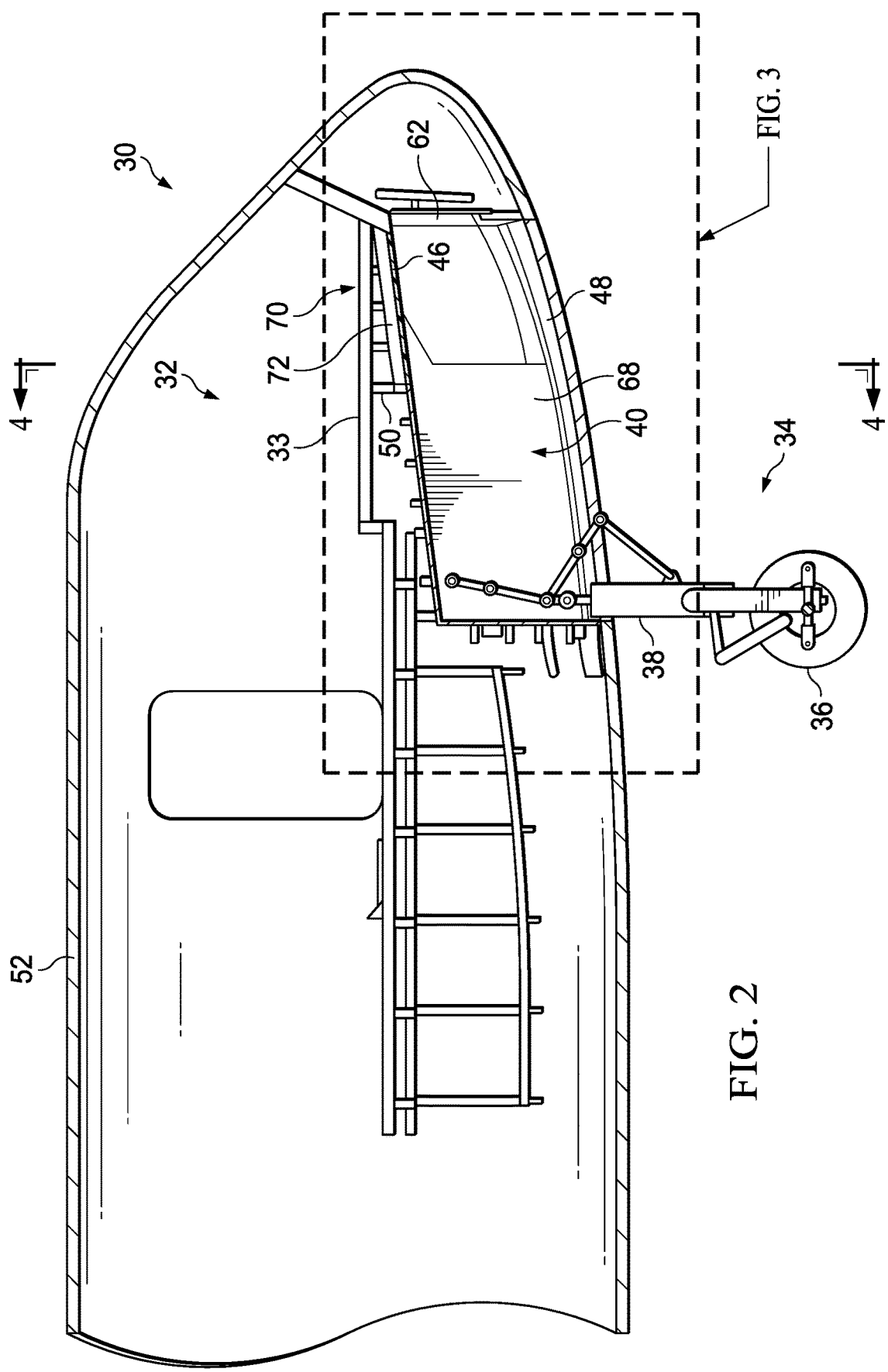
FIG. 2 is an illustration of a fragmentary, cross sectional view of the nose section of the aircraft shown in FIG. 1, the nose landing gear shown in a deployed condition.

Attention is now directed to FIGS. 2-8 which show additional details of the nose section 30. The nose section 30 comprises airframe components including bulkheads 62, 64, 66 (FIG. 5), longitudinally spaced frames 54 (FIG. 6), longitudinal stringers (not shown) and an external skin 52. A flight deck 32 is located in the nose section 30 and includes a flight deck floor 33 (FIGS. 3 and 4), positioned above a nose landing gear well 40, sometimes referred to as a landing gear bay. The flight deck 32 is supported by a floor grid assembly 70 (FIGS. 6 and 7) that includes longitudinal beams 72, and lateral beams 74 connected to the frames 54. In some examples, the flight deck 32 may be supported on top of a nose landing gear box 68 within a nose landing gear well 40 by stanchions 50 (FIG. 2). The flight deck 32 is a pressurized space 42, while the nose landing gear well 40 is a non-pressurized space 44. The pressurized flight deck is separated and sealed from the non-pressurized nose landing gear well 40 by a pressure deck 46.

Figure 3:
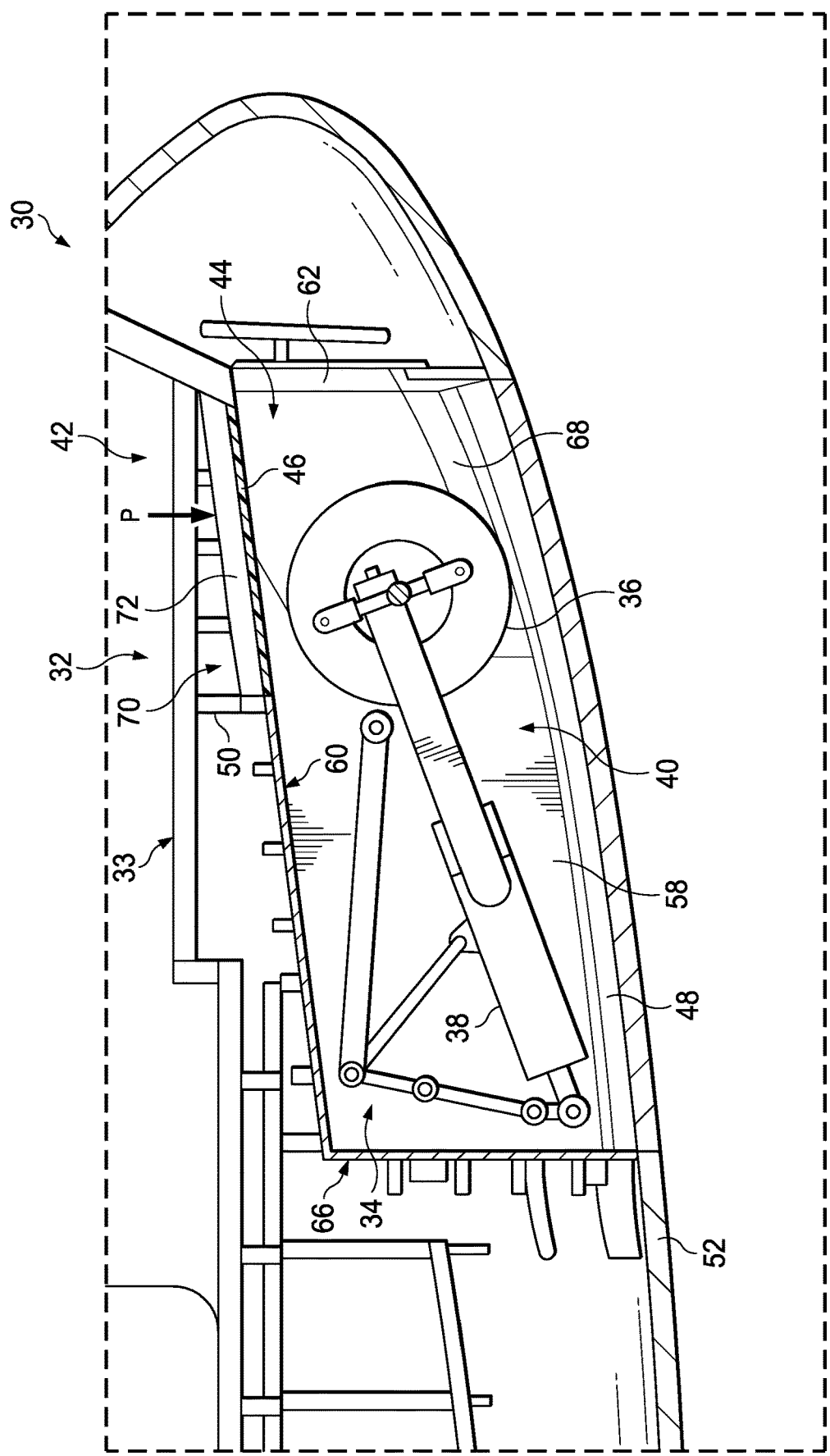
FIG. 3 is an illustration of the area designated as "FIG. 3" in FIG. 2, but showing the nose landing gear in a stowed condition.
Figure 4:
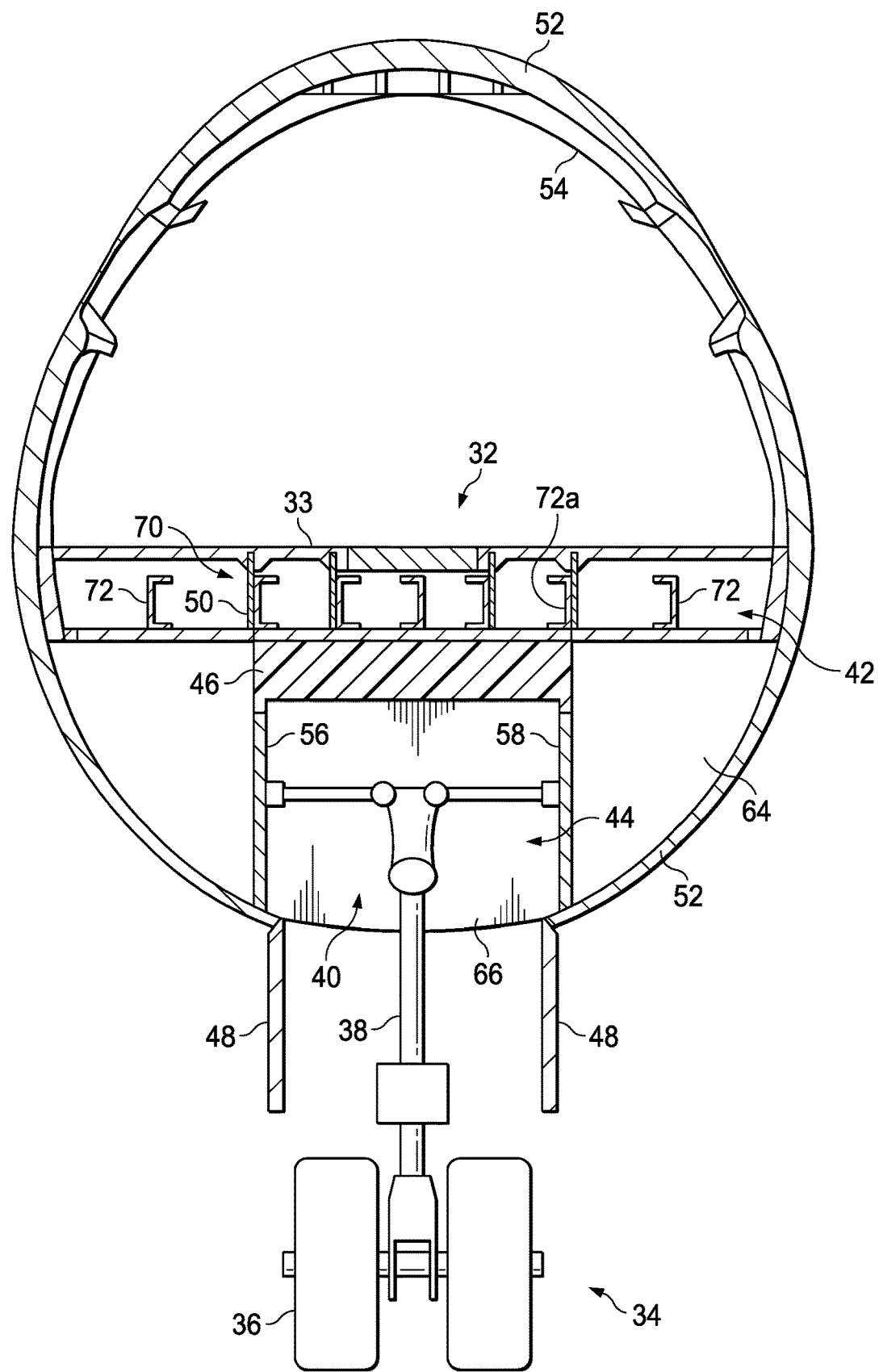
FIG. 4 is an illustration of a sectional view taken along the line 4-4 in FIG. 2.
Figure 5:
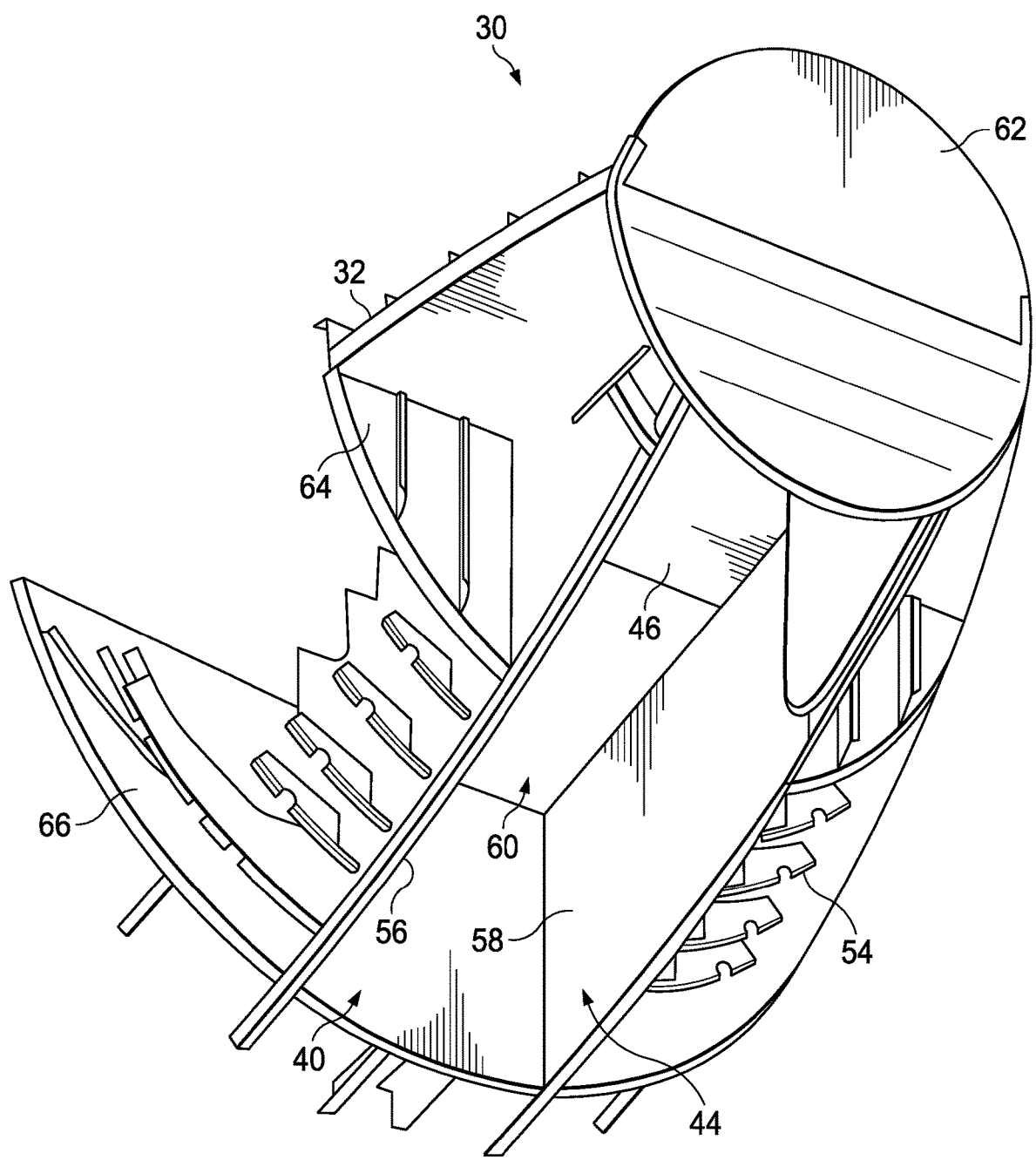
FIG. 5 is an illustration of a bottom perspective view of the nose landing gear wheel well section of the airframe, the nose landing gear not shown for clarity.
Figure 6:
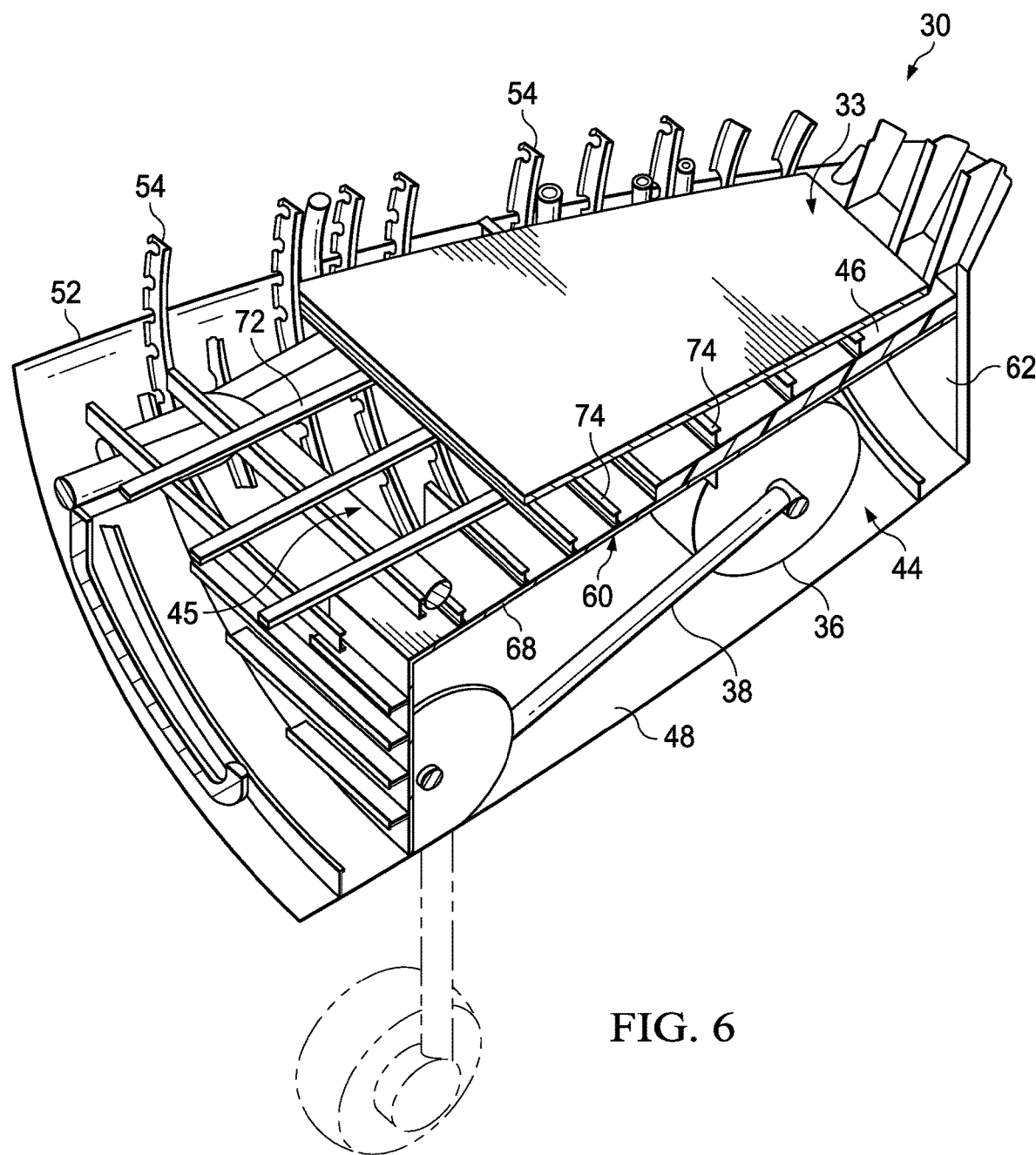
FIG. 6 is an illustration of a top perspective view of the nose section of the airframe, also showing the location of the nose landing gear in both stowed and deployed conditions.
Figure 7:
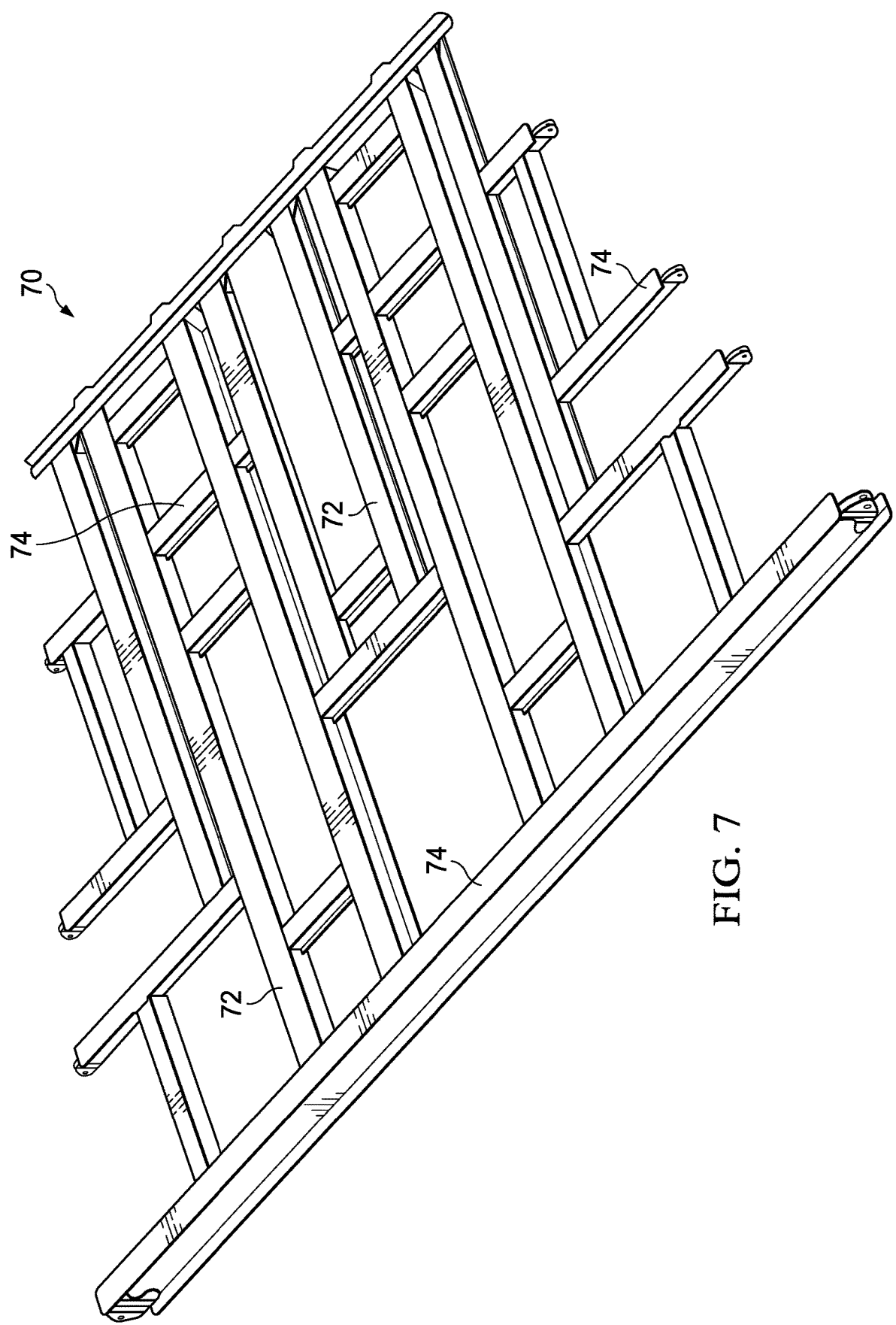
FIG. 7 is an illustration of a perspective view of a floor grid assembly forming part of the nose section of the airframe shown in FIG. 6.

A nose landing gear 34 is mounted within the nose landing gear well 40 and comprises wheels 36 mounted on a pivoting strut 38, and other components (not shown) that are normally stowed in the nose landing gear well 40 during flight. In preparation for landing, nose landing gear well doors 48 are swung open, allowing the nose landing gear 34 to pivot downwardly from its stowed position (FIG. 3) to a deployed position (FIGS. 2 and 4).

The landing gear box 68 is defined by opposing port and starboard sidewalls 56, 58, forward and aft bulkheads 62, 66 and a top wall 60 which includes a pressure deck 46. As best seen in FIG. 3, the pressure deck 46 is upwardly sloped toward the front of the landing gear box 68 in order to provide adequate space for the wheels 36 when stowed. A best seen in FIG. 3, the pressure deck 46 is substantially flat and is located at the front of the landing gear box 68, immediately above the wheels 36 when stowed and is therefore particularly subject to impact by foreign object debris (FOD) hurled into the nose landing gear well 40 during take-off and landings.

The pressure deck 46 forms a hermetic seal between the flight deck 32 (pressurized space 42) and the nose landing gear well 40 (non-pressurized space 44). Pressure in the pressurized space 42, sometimes referred to a "cabin pressure" P applied to the pressure deck 46, is a function of the pressure differential that exists between the pressurized space 42 and the external air pressure. This pressure differential increases as the aircraft increases in altitude, consequentially the load on the pressure deck 46 likewise increases.

Figure 8:
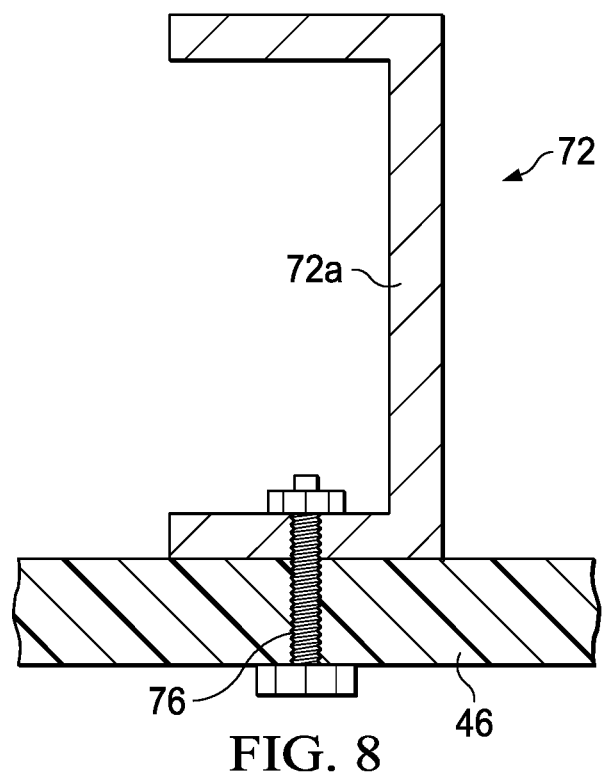
FIG. 8 is an illustration of a cross-sectional view showing how the pressure deck may be attached to beams that reinforce the pressure deck and support the floor grid assembly of FIG. 7.

The pressure deck 46 reacts the cabin pressure P applied by the pressurized (cabin) space 42, while also acting as a structural barrier that prevents any penetration into pressurized space 42 by debris entering the nose landing gear well 40. The pressure deck 46 may be attached to components of the floor grid assembly 70 by stanchions 50. For example, as shown in FIG. 8, the top of the pressure deck 46 may be attached by fasteners 76 to one or more of pressure deck beams 72a.

Figure 9:
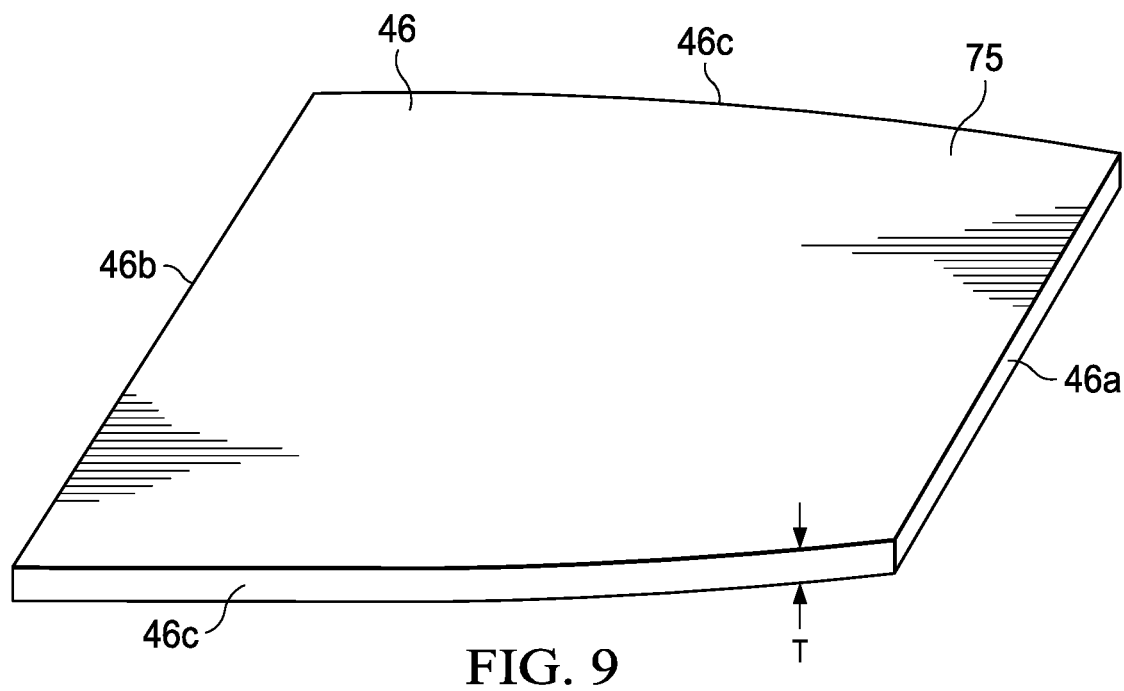
FIG. 9 is an illustration of a perspective view of a flat composite panel with integrated tear arrestment.
Figure 12:
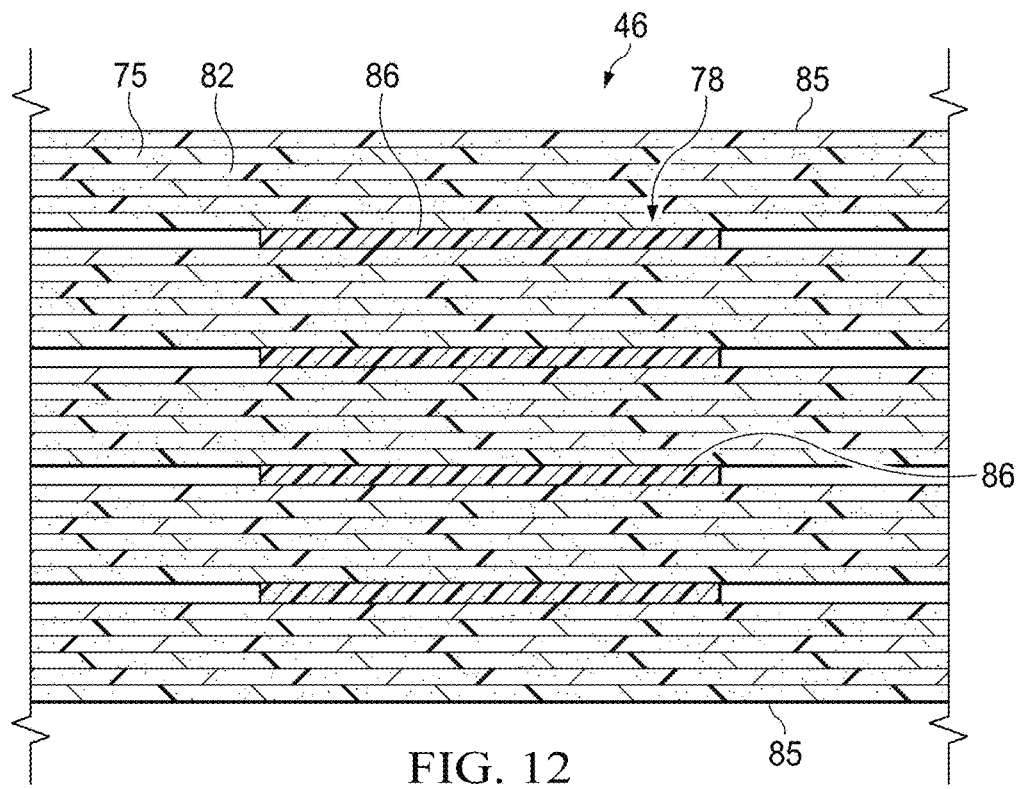
FIG. 12 is an illustration of a sectional view taken along the line 12-12 in FIG. 10.

Attention is now directed to FIGS. 9 and 10 which illustrate additional details of a pressure deck 46 that is suitable for the aircraft application described above. It should be noted, however, the principles of the disclosed pressure deck 46 including a flat composite laminate panel may be used in a wide variety of other applications. In the illustrated example, the pressure deck 46 has a generally trapezoidal shape formed by front and rear edges 46a, 46b connected by sides 46c having a slight curvature matching the taper of the nose section 30. However, the pressure deck 46 may have any other shape that is suitable for the application. The thickness T of the pressure deck will depend on the application, including the amount of pressure that must be reacted and the degree of impact tear resistance that is required.

The pressure deck 46 comprises a flat composite laminate base panel 75 having a plurality of integrated first tear straps 78, also referred to herein as longitudinal tear straps 78, and a plurality of integrated second tear straps 80, also referred to herein as lateral tear straps 80. In the illustrated example, seven spaced apart, longitudinal tear straps 78 are shown extending in the longitudinal direction of the aircraft 20 which are spaced apart from each other equal distances, however in other examples the spacing may not be equal, and more or less than seven longitudinal tear straps 78 may be provided.

Four equally spaced lateral tear straps 80 are integrated into the base panel 75, however, in other examples more or less than four lateral tear straps 80 may be provided, and may be irregularly spaced. The longitudinal tear straps 78 and the lateral tear straps 80 extend in directions that are transverse to each other, which in this example are orthogonal. The tear straps 78, are spaced apart in the thickness T direction of the pressure deck 46 in order to arrest the propagation of cracks (sometimes also referred to herein as "tears") that may occur anywhere throughout the thickness T. Similarly, the tear straps 78, 80 are spaced apart from each other in the longitudinal and lateral directions in order to arrest the propagation of cracks/tears occurring anywhere throughout the length and width of the pressure deck 46.

In the illustrated pressure deck application, orthogonal orientation of the tear straps 78, 80 provides the pressure deck 46 with increased bending strength in the lateral and longitudinal directions in order to better react impact loads from FOD, while also providing crack propagation arrestment in both of these directions. The tear straps 78, 80 crossover or intersect each other at intersection points 90. Depending upon the anticipated direction of loading, the directions of the longitudinal tear straps 78 and the lateral tear straps 80 may not be orthogonal, but rather may intersect each other at angles other than 90 degrees, including but not limited to an angular arrangement forming an "X" pattern. In the illustrated example, the longitudinal and lateral tear straps 78, 80 are arranged orthogonal to each other in order to arrest cracks/tears propagating in either the longitudinal direction or the lateral direction of the pressure deck 46. The width W of the longitudinal and lateral tear straps, 78, 80 may vary, depending on the application.

Referring also to FIGS. 11-15, the pressure deck 46 includes a composite laminate base panel 75 comprising a plurality base panel plies 82 of composite material, such as a fiber reinforced polymer plies (FRP), which may be a thermoset, a thermoplastic or a hybrid material system including both a thermoset and thermoplastic. In one example, the base panel plies 82 are carbon fiber epoxy which may be in the form of tape or tows. The fiber orientations of the base panel plies 82 may vary between 0° and 90° and are orthogonal to the fiber orientation of at least one of the longitudinal tear straps and the lateral tear straps 80. The longitudinal tear straps 78 each comprise one or more longitudinal tear strap plies 86 of unidirectional FRP interspersed in a desired, predetermined order with the base panel plies 82. In the example shown in FIG. 12, four longitudinal tear strap plies 86 shown interspersed between groups of six base panel plies 82, however, in other examples there may be any number of base panel plies 82 in each group thereof. The base panel plies 82 as well as the lateral and longitudinal tear strap plies 84, 86 may be laid up using automatically controlled laminators, such as automatic fiber placement heads (not shown), or they may be laid up manually. In other examples, the lateral and longitudinal tear straps 78, 80 may be integrated into the base panel 75 by placing them on either, or both of the outer faces 85 of the base panel 75. In examples where the tear straps 78, 80 are located on the outer faces 85, they may be arranged such that they respectively extend in directions that are transverse to each other. In still other examples, the tear straps 78, 80 may be interspersed within the base panel plies as well as located on either or both of the outer faces 85 of the base panel 75.

While only one longitudinal tear strap ply 86 is shown between the groups of the base panel plies 82 (see FIG. 12), any number of longitudinal tear strap plies 86 may be interspersed between groups of the base panel plies 82. In other words, groups of the longitudinal tear strap plies 86 may be interspersed between groups of the base panel plies 82. In the illustrated example, following compaction and curing, the pressure deck 46 will normally have smooth outer faces 85 because of the relatively few number of tear strap plies 84, 86 present within the thickness T of the pressure deck 46. In other examples where the ratio of tear strap plies 84, 86 to base panel plies 82 is relatively high, the outer faces 85 may exhibit some degree of rippling or unevenness.

In the disclosed pressure deck application however, any unevenness in the outer faces 85 will not adversely affect the performance of the pressure deck 46. In other applications requiring smooth outer faces, for esthetic or other reasons, a fewer number of tear strap plies 84, 86 may be used to achieve a desired smoothness of the outer faces 85. Furthermore, in the illustrated example, the same number of base panel plies 82 separate the longitudinal tear strap plies 86 from each other, causing them to be evenly spaced within the stack of base panel plies 82, however in other examples the longitudinal tear strap plies 86 may not be evenly spaced within the stack of base panel plies 82 as a result of using different numbers of base panel plies 82 in each group thereof to separate the longitudinal tear strap plies 86 from each other. Also, in the illustrated example, the longitudinal tear strap plies 86 are of constant width and are vertically aligned in the stack of base panel plies 82, however, another examples they may have varying widths and may not be aligned as illustrated, depending upon the application, and anticipated loading. The tear straps 78, 80 may have any desired thickness.

Figure 13:
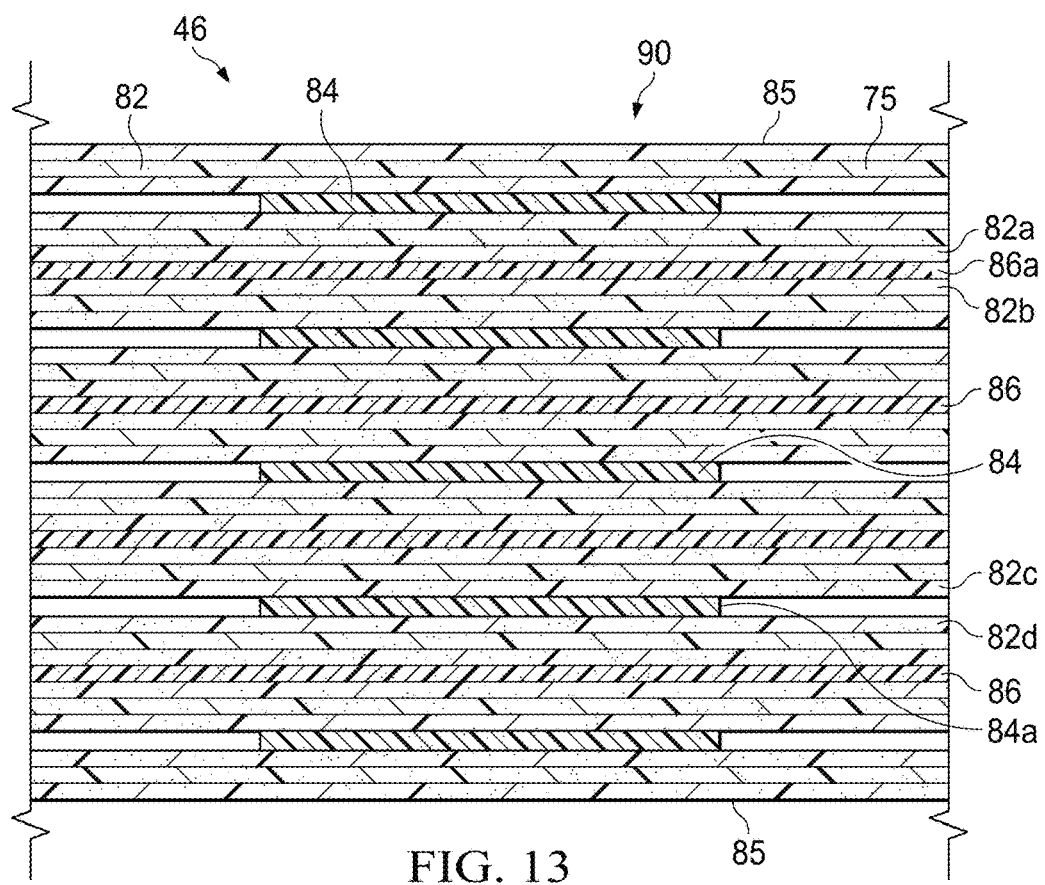
FIG. 13 is an illustration of a sectional view taken along the line 13-13 in FIG. 10.

FIG. 11 shows one example of lateral tear strap plies 84 interspersed between groups of four base panel plies 82. Similar to the description of the longitudinal tear straps 78 discussed above, the lateral tear straps 80 may comprise any number of lateral tear strap plies 84 arranged in any order within the stack of base panel plies 82. As in the case of the longitudinal tear strap plies 86, the lateral tear strap plies 84 may be formed of tape or tows of FRP containing unidirectional fibers. Typically, the fiber orientations of the longitudinal tear strap plies 86 and the lateral tear strap plies 84 will be orthogonal to the fiber orientations of the base panel plies 82 which they adjoin in order to enhance the ability of the tear straps 78, 80 to arrest the propagation of cracks/tears. For example, as shown in FIG. 13, longitudinal tear strap ply 86a adjoins base panel plies 82a and 82b. The fiber orientation of longitudinal tear strap ply 86a is orthogonal to the fiber orientation of base panel plies 82a and 82b. Similarly, lateral tear strap ply 84a adjoins base panel plies 82c and 82d. The fiber orientation of lateral tear strap ply 84a is orthogonal to the fiber orientation of base panel plies 82c and 82d. The lateral tear strap plies 84 may or may not be vertically aligned, and each may have any width, depending on the application. Also, depending on the application, the number of the lateral tear strap plies 84 may or may not be the same as a number of the longitudinal tear strap plies 86. For example, in some applications, it may be desirable to provide a greater number of longitudinal tear strap plies 86 than the number of lateral tear strap plies 84 in order to provide the pressure deck 46 with greater strength in the lateral direction than the longitudinal direction, and vice versa. While only one lateral tear strap ply 84 is shown between the groups of the base panel plies 82, any number of lateral tear strap plies 84 may be interspersed between groups of the base panel plies 82. In other words, groups of the lateral tear strap plies 84 may be interspersed between groups of the base panel plies 82. The number of tear straps 78, 80 as well as their widths and thicknesses will depend on the application but should be chosen so as to be adequate to arrest cracks/tears throughout the pressure deck 46 without adding unnecessary weight to the pressure deck 46.

Referring to FIG. 13, the lateral tear strap plies 84 are arranged in regular, alternating order with the longitudinal tear strap plies 86, however, in other examples, they may not be arranged in a regular, alternating manner. Depending on the application, and loading, each of the longitudinal tear straps 78, and lateral tear straps 80 may include any number of lateral tear strap plies 84 and longitudinal tear strap plies 86, arranged in any order within the stack of base panel plies 82. While the lateral tear straps 80 comprises 5 tear strap plies 84 separated by 3 base panel plies 820 in the illustrated example, the number of lateral tear strap plies and base panel plies 82 may vary with the application and expected loading.

In the illustrated example, the same number of base panel plies 82 separate the lateral tear strap plies 84 from each other, causing them to be evenly spaced within the stack of base panel plies 82, however in other examples, the lateral tear strap plies 84 may not be evenly spaced within the stack of base panel plies 82 as a result of using different numbers of base panel plies 82 in each group thereof to separate the lateral tear strap plies 84 from each other. Spacing the tear straps 78, 80 within the base panel plies 82 provides crack propagation arrestment throughout the thickness of the pressure deck 46. In some examples, the tear strap plies 84, 86 may be more or less concentrated near the outer faces of the base panel 75, while in other examples, they may be more or less concentrated in the middle of the thickness of the base panel 75. In some examples, the tear straps 78, 80 may be placed on the outer faces of the base panel 75.

Figure 14:
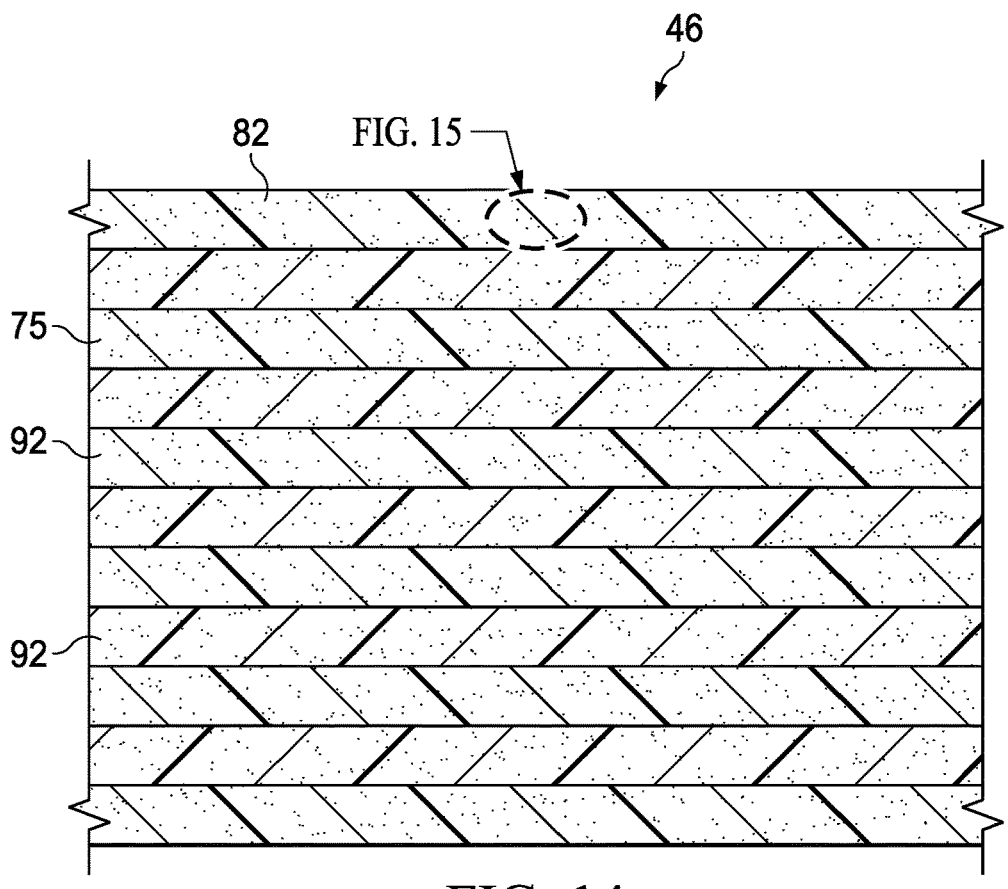
FIG. 14 is an illustration of a top plan view of one ply a longitudinal tear strap.
Figure 15:
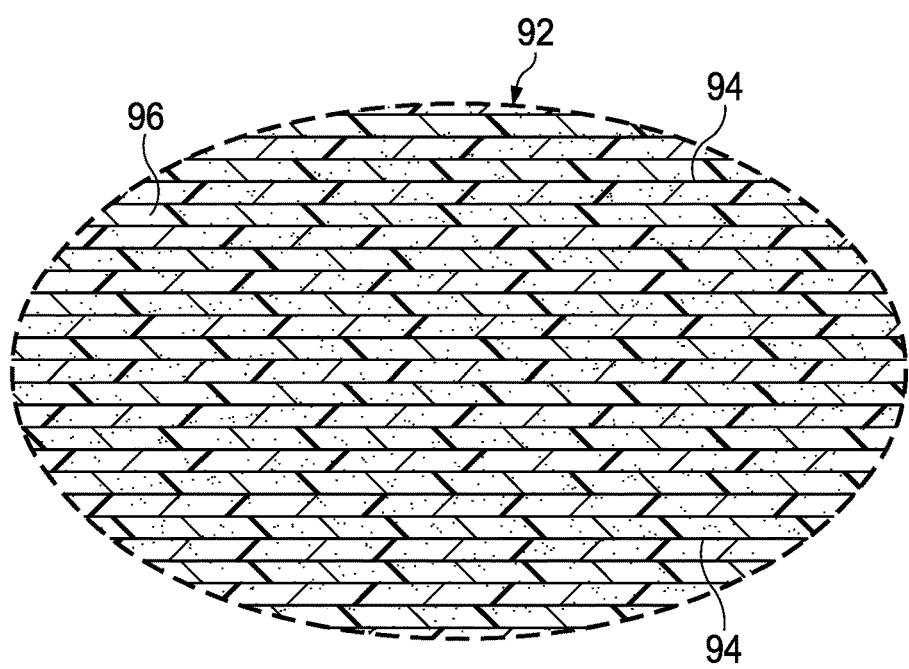
FIG. 15 is an illustration of the area designated as "FIG. 15" in FIG. 14.

Referring to FIGS. 14 and 15, the pressure deck may be laid up by hand or using an automatic fiber placement machine (not shown) which layup strips 92 of FRP either in tape form or in tows. Each of the FRP strips 92 contains unidirectional reinforcing fibers 94 held in a polymer matrix 96, as mentioned earlier. Generally, the fiber orientations of the longitudinal tear straps 78 and the lateral tear straps 80 will be orthogonal to the fiber orientations of the base panel plies 82 that they face in order to better arrest propagation of any cracks beyond the tear strap that might be created within the pressure deck 46. Moreover, the fiber orientations of the longitudinal and lateral tear straps 78, 80 are orthogonal to each other. Consequently, a crack/tear in the base panel 75 propagating in the direction of the fiber orientations of the base panel plies 82 will intersect and be stopped by either the longitudinal tear straps 78 or the lateral tear straps 80. Although not shown in the drawings, in some examples, the pressure deck 46 may include a core formed of suitable materials sandwiched between the base panel plies 82 in order to enhance the strength and resistance of the pressure deck 46 to impairment due to impacts.

As explained earlier, the number, size, and placement of the lateral and longitudinal tear strap plies 84, 86, as well as their separation from each other in the stack of base panel plies 82 will depend on the requirements of the particular application, such as the amount and direction of loading. For example, where higher loading is expected, a greater number of plies 84, 86 may be employed. Similarly, where greater loading is expected in the longitudinal direction compared to the lateral direction, a greater number of longitudinal tear strap plies 86 may be used to adequately react the load in the longitudinal direction. Conversely, where greater loading is expected in the lateral direction compared to the longitudinal direction, a greater number of lateral tear strap plies 84 may be used to adequately react the load in the lateral direction. Increasing the number of tear strap plies 84, 86 increases bending strength of the pressure deck 46 in order to react the loads imposed on it by the cabin pressure P as well as impacts by FOD. In addition to increasing the bending strength of the pressure deck 46, the tear straps 78, 80 arrest propagation of any interlaminar tears or cracks in the base panel 75 caused by FOD impacts. Cracks or tears are undesirable because they may compromise the ability of the pressure deck 46 to maintain a hermetic seal between the pressurized and non-pressurized spaces 42, 44. Any such cracks or tears propagating in the direction of the fiber orientations of the base panel plies 82 are stopped by the tear straps 78, which act to interrupt any continuation of such cracks/tears.

Figure 16:
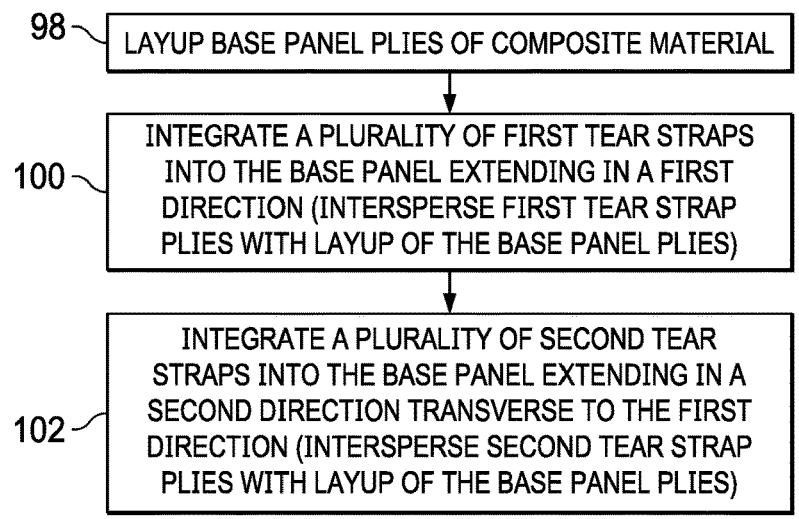
FIG. 16 is an illustration of a flow diagram showing a method of making the flat composite panel.

Attention is now directed to FIG. 16, which broadly illustrates the steps of a method of making a composite pressure deck 46. Beginning at 98, a base panel is fabricated by laying up base panel plies 82 of composite material, such as an FRP. At 100, a plurality of first tears straps 78 are integrated into the base panel by interspersing them within the base panel plies 82 as the base panel plies 82 are being laid up. Laying up the first tear straps 78 includes orienting the first tear straps 78 in a first direction, such as for example, a longitudinal direction. At 102, a plurality of second tear straps 80 are integrated into the base panel by interspersing them within the base panel plies 82 as the base panel plies 82 are being laid up in step 98 above. Laying up the second tear straps 80 includes orienting the second tear straps 80 in a second direction that is transverse to the first direction, such as for example, a lateral direction. Plies 82, 84 and 86 may be laid up using an automatic lamination machine, or manually, or by a combination of manual and automatic methods.

Figure 17:
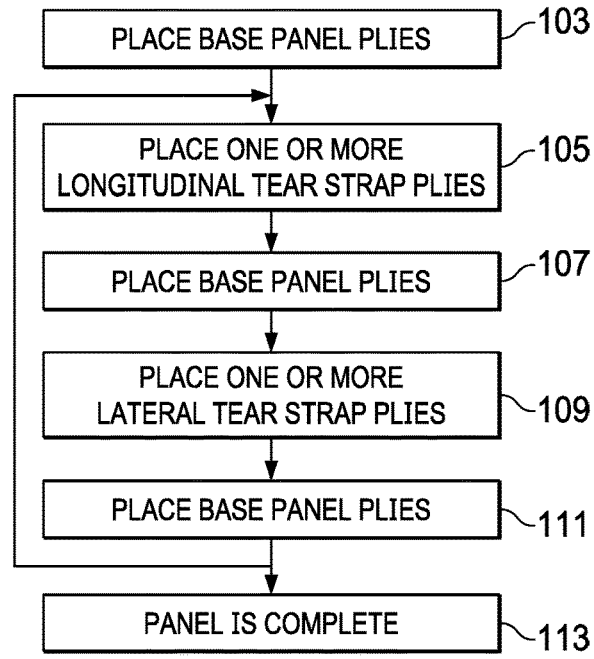
FIG. 17 is an illustration of a flow diagram showing a method of making a pressure deck panel.

FIG. 17 broadly illustrates the steps of a method of making a pressure deck 46 for an aircraft 20. Beginning at 103, base panel plies 82 are placed, as by laying up one or more plies of a composite material. At 105, one or more longitudinal tear strap plies 86 are placed by laying up composite material over the base panel plies 82 laid up at 103. At 107, additional base panel plies 82 are placed on the longitudinal tear strap plies 86 placed at 105. At 109, one or more lateral tear strap plies are placed on the base panel plies 82 placed at 107. Steps 105 and 109 include orienting the longitudinal tear strap plies 86 and lateral tear strap plies 84 substantially orthogonal to each other. At 111, additional base panel plies 82 are placed on the lateral tear strap plies 84 placed at 109. Steps 103-111 are repeated until the pressure deck 46 is complete at 113.

Figure 18:
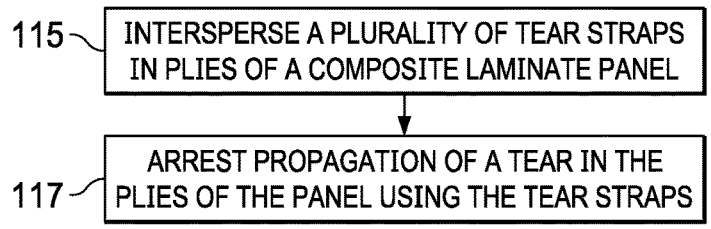
FIG. 18 is an illustration of a flow diagram showing a method of arresting a tear in a composite laminate panel.

FIG. 18 broadly illustrates the steps of a method of arresting a tear in a composite laminate panel. At 115, a plurality of tear straps 78, 80 each comprising one or more tear strap plies are interspersed within plies of a composite laminate panel. At 117, propagation of a tear in the plies in the panel is arrested using the tear straps 78, 80.

Figure 19:
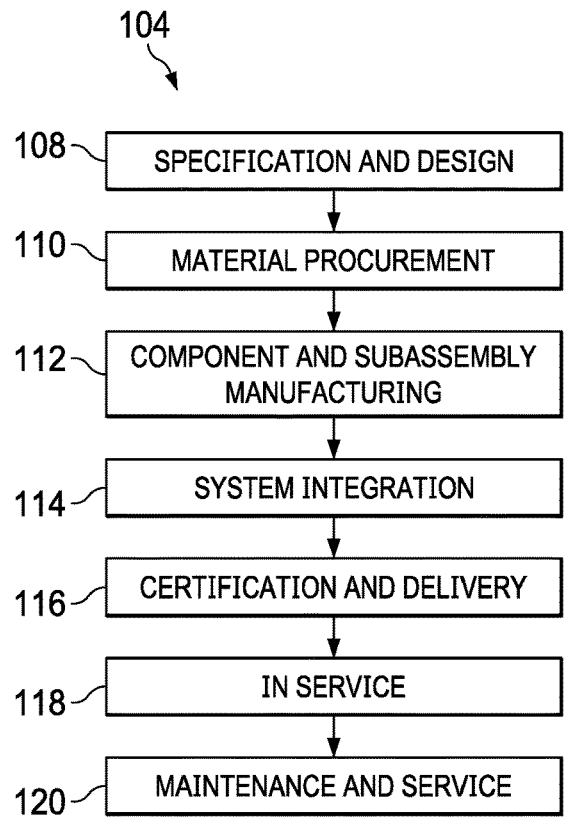
FIG. 19 is an illustration of a flow diagram of aircraft production and service methodology.
Figure 20:
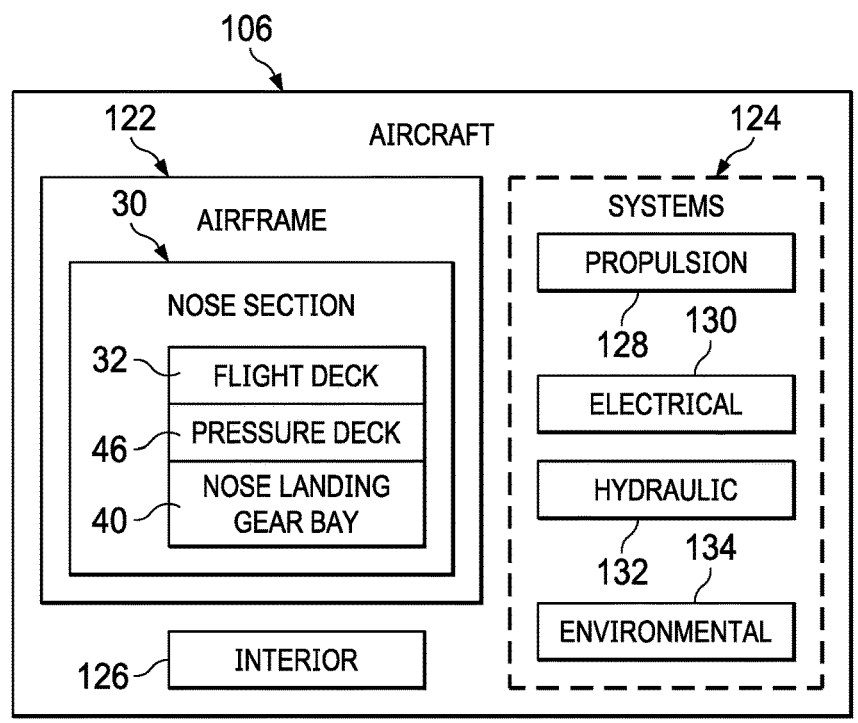
FIG. 20 is an illustration of a block diagram of an aircraft.

Examples of the disclosure may find use in a variety of potential applications, particularly in the transportation industry, including for example, aerospace, marine, automotive applications, and other application where composite laminate panels, such as pressure decks in aircraft, may be used. Thus, referring now to FIGS. 19 and 20, examples of the disclosure may be used in the context of an aircraft manufacturing and exemplary method 104 as shown in FIG. 19 and an aircraft 106 as shown in FIG. 20. Aircraft applications of the disclosed examples may include a variety of flat composite laminate panel structures, but are not limited to pressure decks. During pre-production, exemplary method 104 may include specification and design 108 of the aircraft 106 and material procurement 110. During production, component and subassembly manufacturing 112 and system integration 114 of the aircraft 106 takes place. Thereafter, the aircraft 106 may go through certification and delivery 116 in order to be placed in service 118. While in service by a customer, the aircraft 106 is scheduled for routine maintenance and service 120, which may also include modification, reconfiguration, refurbishment, and so on. The disclosed panel and method may be used in each of at least steps 112, 114, as well as in the nose section 30 and the pressure deck 46.

Each of the processes of exemplary method 104 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 20, the aircraft 106 produced by exemplary method 104 may include an airframe 122 with a plurality of systems 124 and an interior 126. Examples of high-level systems 124 include one or more of a propulsion system 128, an electrical system 130, a hydraulic system 132 and an environmental system 134. Any number of other systems may be included. The airframe 122 includes nose section 30, in which a pressure deck 46 separates and forms a hermetic seal between a pressurized flight deck 32 and a non-pressurized nose landing gear well 40. Although an aerospace example is shown, the principles of the disclosure may be applied to other industries, such as the marine and automotive industries where a flat composite laminate panel with high stiffness, impact resistance and integrated tear arrestment may be desirable or required.

Systems and methods embodied herein may be employed during any one or more of the stages of the aircraft manufacturing and exemplary method 104. For example, components or subassemblies corresponding to production process 112 may be fabricated or manufactured in a manner similar to components or subassemblies produced while the aircraft 106 is in service. Also, one or more apparatus examples, method examples, or a combination thereof may be utilized during the production processes 112 and system integration 114, for example, by substantially expediting assembly of or reducing the cost of an aircraft 106. Similarly, one or more of apparatus examples, method examples, or a combination thereof may be utilized while the aircraft 106 is in service, for example and without limitation, to maintenance and service 120.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different advantages as compared to other illustrative examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A composite panel having tear arrestment, comprising:
a base panel including a plurality of base panel plies of a fiber reinforced polymer;
at least a first tear strap extending in a first direction and integrated into the base panel plies, the at least first tear strap comprising a plurality of first tear strap plies interspersed along a thickness of the base panel between plies of the base panel plies; and
at least a second tear strap extending in a second direction transverse to the first direction and integrated into the base panel plies, the at least second tear strap comprising a plurality of second tear strap plies interspersed along the thickness of the base panel between the plies of the base panel plies;
wherein a fiber orientation of a ply of the first tear strap plies is orthogonal to a fiber orientation of a base panel ply that the ply of the first tear strap plies adjoins and a fiber orientation of a ply of the second tear strap plies is orthogonal to a fiber orientation of a base panel ply that the ply of the second tear strap plies adjoins.

2. The composite panel of claim 1, wherein at least one ply of the first tear strap plies is located on an outer face of the base panel.

3. The composite panel of claim 1, wherein the first tear strap and the second tear strap are separated from each other by plies of the base panel plies.

4. The composite panel of claim 1, further comprising:
a plurality of first tear straps extending substantially parallel to each other in the first direction and integrated into the base panel plies; and
a plurality of second tear straps extending substantially parallel to each other in the second direction and integrated into the base panel plies.

5. The composite panel of claim 4, wherein:
the first tear straps are spaced apart from each other, and the second tear straps are spaced apart from each other.

6. The composite panel of claim 4, wherein:
each of the first tear straps includes a plurality of plies of a fiber reinforced polymer interspersed with the base panel plies, and
each of the second tear straps includes a plurality of plies of a fiber reinforced polymer interspersed with the base panel plies.

7. The composite panel of claim 6, wherein:
the first tear straps and the second tear straps intersect each other and are separated from each other by at least one of the base panel plies.

8. A pressure deck panel for an aircraft separating a flight deck from a nose landing gear well, comprising:
a base panel including a plurality of base panel plies of a fiber reinforced polymer; and
a plurality of tear straps integrated into the base panel, wherein each tear strap comprises a plurality of tear strap plies interspersed along a thickness of the base panel between plies of the base panel plies;
wherein a fiber orientation of a tear strap ply of each tear strap is orthogonal to a fiber orientation of a ply of the base panel that the tear strap ply of each tear strap adjoins.

9. The pressure deck panel of claim 8, wherein each of the tear straps includes a plurality of tear strap plies of a fiber reinforced polymer evenly spaced within the base panel plies of the base panel.

10. The pressure deck panel of claim 8, wherein:
the tear straps include a plurality of longitudinal tear straps, and a plurality of lateral tear straps, and
the plurality of longitudinal tear straps, and the plurality of lateral tear straps intersect each other.

11. The pressure deck panel of claim 10, wherein:
the longitudinal tear straps and lateral tear straps extend substantially orthogonal to each other.

12. The pressure deck panel of claim 10, wherein the longitudinal tear straps, and the lateral tear straps each contain unidirectional reinforcing fibers.

13. The pressure deck panel of claim 10, wherein the base panel is substantially flat.

14. The pressure deck panel of claim 10, wherein the longitudinal tear straps, and lateral tear straps are separated from each other by at least one base panel ply of the base panel.

15. A method of fabricating a composite pressure deck panel for an aircraft, comprising:
    laying up a base panel, including laying up a plurality of base panel plies of composite material;
    integrating a plurality of first tear straps into the base panel plies, including interspersing a plurality of first tear strap plies of the first tear straps along a thickness of the base panel within the base panel plies as the base panel plies are laid up; and
    integrating a plurality of second tear straps into the base panel plies, including interspersing a plurality of second tear strap plies of the second tear straps along the thickness of the base panel within the base panel plies as the base panel plies are laid up;
    wherein a fiber orientation of a tear strap ply of each tear strap is orthogonal to a fiber orientation of a ply of the base panel that the tear strap ply of each tear strap adjoins.

16. The method of claim 15, wherein laying up the base panel plies, integrating the plurality of first tear straps and integrating a plurality of the second tear straps are each performed using an automatic fiber placement machine.

17. The method of claim 15, wherein integrating a plurality of first tear straps includes laying up first tear strap plies between groups of the base panel plies.

18. The method of claim 17, wherein integrating a plurality of second tear straps includes:
    laying up second tear strap plies between groups of the base panel plies, and
    alternating the first tear strap plies with the second tear strap plies.

19. The method of claim 15, further comprising arranging the first tear straps and the second tear straps, such that they extend transverse to and intersect each other.

20. The method of claim 15, wherein:
    integrating the plurality of first tear straps includes spacing apart the first tear straps, and
    integrating the plurality of second tear straps includes spacing apart the second tear straps.

21. A method of arresting a tear in a composite laminate panel, comprising:
    integrating a plurality of tear straps within a plurality of plies of the laminate panel, including interspersing a plurality of tear strap plies of a tear strap along a thickness of the laminate panel within the plies of the laminate panel, wherein a fiber orientation of a tear strap ply of each tear strap is orthogonal to a fiber orientation of a ply of the laminate panel that the tear strap ply of each tear strap adjoins; and
    using the tear straps to arrest a tear in the laminate panel.

22. The method of claim 21, wherein integrating the plurality of tear straps includes arranging the tear straps within the laminate to intersect to each other.

23. The method of claim 22, wherein the arranging includes orienting the tear straps orthogonal to each other.

* * * * *